March 28, 1939.  J. NEEDHAM  2,152,207
VARIABLE SPEED REDUCER
Filed April 16, 1936  2 Sheets-Sheet 1
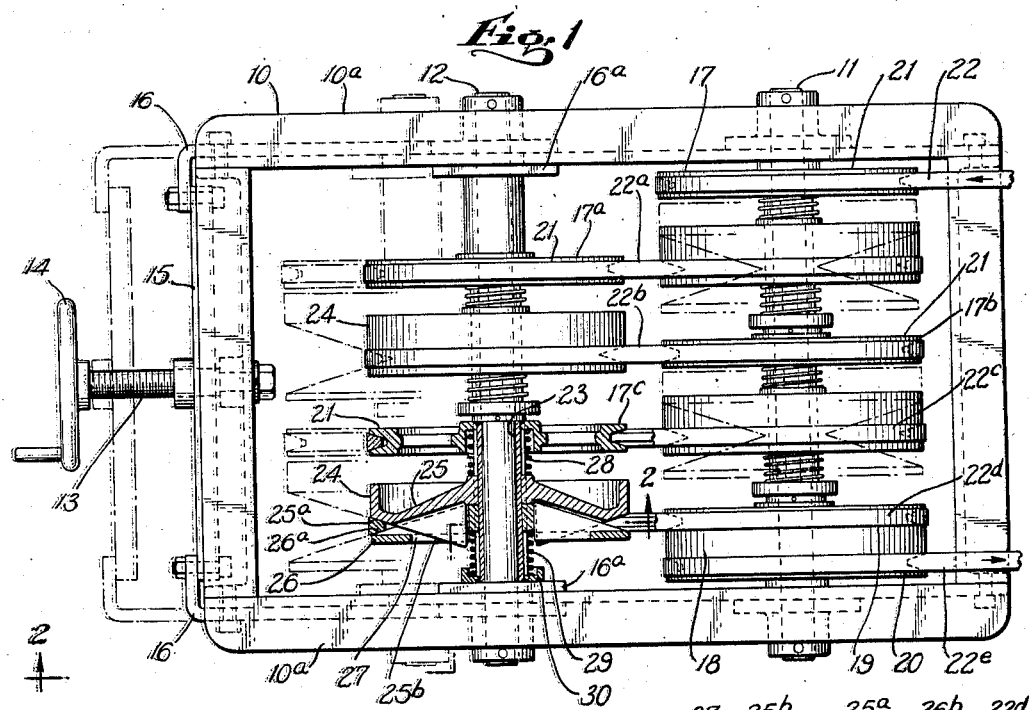
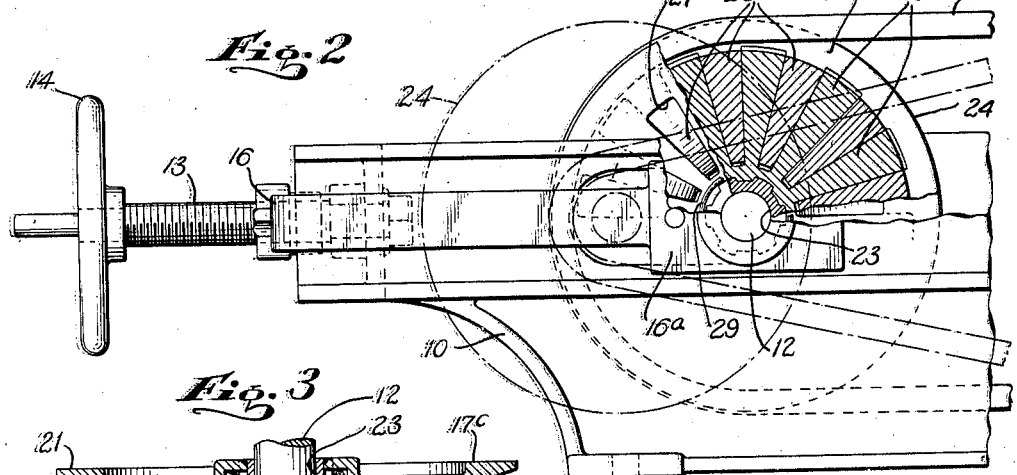
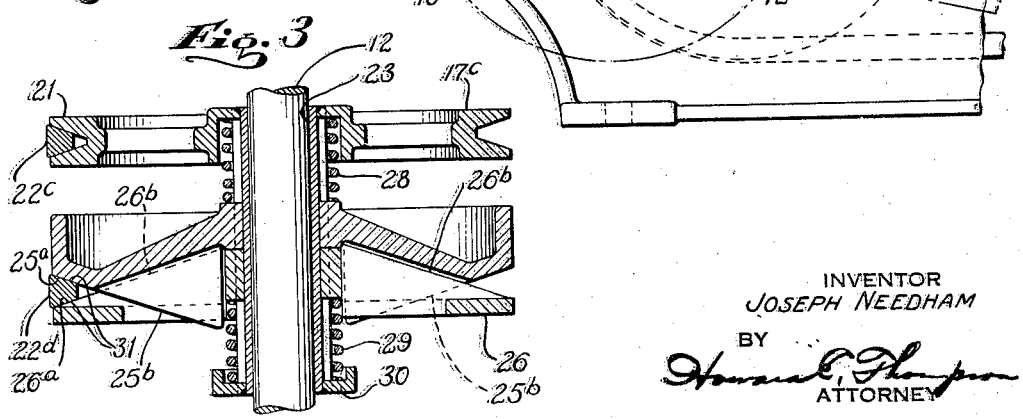
INVENTOR
JOSEPH NEEDHAM
BY
ATTORNEY March 28, 1939.   J. NEEDHAM   2,152,207
VARIABLE SPEED REDUCER
Filed April 16, 1936    2 Sheets-Sheet 2
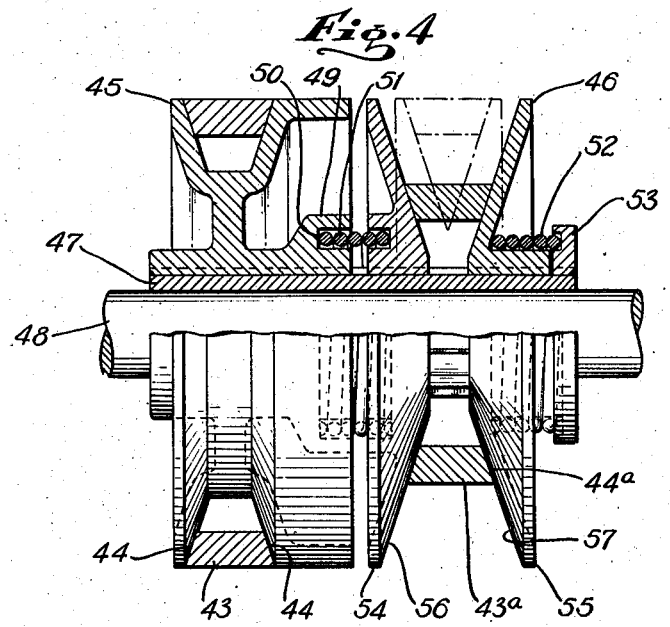
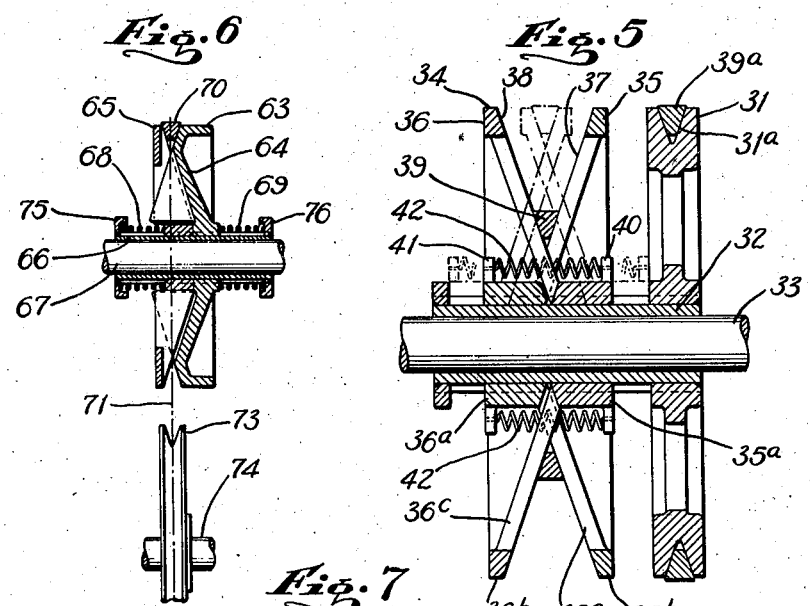
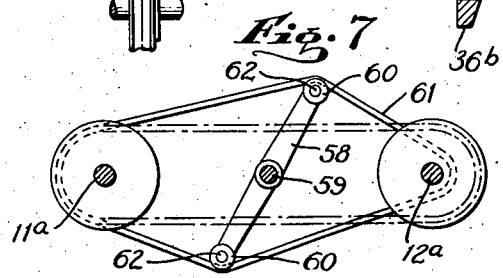
INVENTOR
JOSEPH NEEDHAM
BY
ATTORNEY Patented Mar. 28, 1939

2,152,207

UNITED STATES PATENT OFFICE 2,152,207

VARIABLE SPEED REDUCER

Joseph Needham, Passaic, N. J.

Application April 16, 1936, Serial No. 74,730

6 Claims. (Cl. 74—230.17)

This invention relates to devices or apparatus for providing a variable speed drive between a drive shaft and a shaft to be driven as well as a variable speed reduction drive involving a plurality of substantially similar units arranged alternately on the drive and driven shafts; and the object of the invention is to provide a device or mechanism of the class described with means for maintaining the drive belt employed in a fixed or relatively fixed center line of travel to eliminate wear upon the side friction surfaces of belts of this type as usually employed in other devices of this kind; a further object being to provide a variable speed drive pulley of the class described employing independent side plates or disks, each of which is tensionally controlled to maintain a fixed belt center line centrally between opposed surfaces of said disks; a further object being to provide a pulley of the class described having interengaging or intermeshing elements on opposed surfaces thereof to facilitate the arrangement of the disks in a compact relationship with respect to each other to reduce the width of the complete pulley formed thereby; a still further object being to provide in conjunction with a variable drive pulley of the class described, a fixed or non-variable pulley to form thereof a variable unit, a number of which units may be employed in forming a reduction drive; and with these and other objects in view, the invention consists in a device or mechanism of the class described, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:—

Fig. 1 is a plan and sectional view of a multiple drive unit which I employ.

Fig. 2 is a partial section on the line 2—2 of Fig. 1 on an enlarged scale.

Fig. 3 is an enlarged sectional view of a part of the construction shown in Fig. 1.

Fig. 4 is a plan and sectional view of a modified form of drive unit which I may employ.

Fig. 5 is a sectional view of another form of unit.

Fig. 6 is a diagrammatic plan and sectional view of a single variable speed drive which I may employ; and, Fig. 7 is a diagrammatic view illustrating a modified method of producing the variable drives of a pulley.

In Figs. 1 and 2 of the drawings, I have indicated one method of producing a variable speed multiple reduction drive, wherein a plurality of substantially similar variable drive units are employed. In said figures, 10 represents an openwork frame in which is mounted a stationary shaft 11 and a movable shaft 12, that is to say, the shaft 12 is movable toward and from the shaft 11 in the frame. The movement is controlled by a feed screw 13 operated through a hand wheel 14 to move an end plate 15 or side strips 16 longitudinally of the side rails 10a of the frame 10. The strips 16 are coupled with the shaft or include bearing portions 16a in which the shaft 12 is mounted.

Rotatably mounted upon the shafts 11 and 12 is a plurality of substantially similar variable speed drive units 17, 17a, 17b, and 17c. At 18 is a take-off unit having two V-grooves 19 and 20. As all of the units 17–17c are of the same construction, the brief description of one will apply to all, and a unit 17c is shown in section in Fig. 1, and on an enlarged scale in Fig. 3 of the drawings. Each unit consists of a fixed pulley 21 having a fixed V-shaped groove in the circumference thereof to adapt the same for use with the conventional V-shaped belt. At 22, I have shown the belt which extends from the pulley on a drive motor or power shaft to the pulley 21 of the unit 17. The pulley 21 is secured to a sleeve 23 rotatably mounted on its supporting shaft. Keyed to this sleeve is a variable speed drive pulley 24 consisting of independent disks 25 and 26.

The inner adjacent surfaces 25a, 26a of these disks are beveled to form friction drive surfaces. These surfaces are cut out as they extend to the hub portions of the disks to form interlocking or intermeshing webs or ribs 25b and 26b as clearly indicated in Fig. 2 of the drawings. The ribs 25b extend through openings 27 formed in the disk 26 so as to provide a compact intermeshing of the disks which make up the variable drive pulley 24. A spring 28 extends between the recessed hub portion of the pulley 21 and the disk 25, and another spring 29 extends between the hub portion of the disk 26 and a collar 30 secured to the sleeve 23.

With this construction, the disks 25 and 26 are capable of movement toward and from each other in the variable speed drives of the respective units or the pulleys 24 thereof without changing the center of the drive belt employed, which belt operates in one of the fixed pulleys 21 of an opposed unit. In other words, the belt 22a extends from the pulley 24 of the unit 17 to the pulley 21 of the unit 17a and the belt 22b extends from the pulley 24 of the unit 17a to the pulley 21 of the unit 17b. A belt 22c extends from the pulley 24 of the unit 17b to the pulley 21 of the unit 17c. Another belt 22d extends from the pulley 24 of the unit 17c to the V-groove 19 of the pulley 18, and a belt 22e extends from the groove 20 of the pulley 18 to a pulley on a shaft to be driven, which is not shown, the latter being referred to as the output. All of the belts 22-22e are provided with beveled side surfaces 31 which are adapted to engage the beveled surfaces 25a, 26a of the variable pulleys 24, as clearly indicated in Fig. 3 of the drawings, as well as to seat snugly in the fixed grooves of the pulleys 21.

Each unit operates independently upon the shafts 11 and 12, and in the position shown in full lines in Fig. 1 of the drawings, the belts are operating in the variable pulleys 24 with their separate disks 25 and 26 arranged in close proximity to each other. However, by moving the shaft 12 to the left by means of the screw 13, the belts may be moved into position to reduce the acting diameter of the respective variable drive pulleys 24 in the manner indicated in dotted lines in Fig. 1 to successively vary the speed of drive of one unit to another to provide a wide range in the ratio of drive depending entirely upon the number of units employed. As the diameters of the pulleys 24 arranged on the shaft 12 are reduced, in like manner, the diameters of the pulleys 24 on the shaft 11 are reduced. In other words, by changing the relative centers of the shafts 11 and 12 one with respect to the other through the adjustment screw 13, the speed of drive may be increased or decreased and successively varied throughout the respective units to any desired ratio, which may be governed by the number of units employed in any particular installation.

In the variable speed and ratio drive of the complete mechanism illustrated in Fig. 1 of the drawings, the centers of drive of the belts 22a, 22b, 22c and 22d remain unchanged. In other words, the pulleys 21 are retained against longitudinal movement on the respective shafts 11 and 12, whereas the separate disks 25 and 26 of the pulleys 24 in each unit move toward and from the center of travel fixed by said belts. This construction eliminates excessive wear upon the beveled friction drive surfaces 31 of the belt which would otherwise be experienced when the center of travel of the belt is varied. By reason of the construction of the pulleys 24 disclosed in Fig. 1 of the drawings, a relatively compact unit is provided, and this would also be true of the structure shown in Fig. 5, whereas with the structure shown in Fig. 4, a slightly greater space will be occupied with the same number of units employed. However, by constructing all of the respective units of the same form and construction, the cost of installing a complete series of units is materially reduced. As shown in Fig. 1 of the drawings, in some cases, a unit similar to the unit 18 will be employed.

The structure disclosed in Fig. 5 of the drawings differs from that shown in Figs. 1 to 3 inclusive by employing a series of coil springs and by modifying the structure of the pulley 24. In this figure, I have shown at 31 a pulley equivalent to the pulley 21 which is welded or otherwise secured to a long sleeve 32 arranged upon a shaft 33 which may constitute either of the shafts 11, 12. At 34, I have shown a variable drive pulley which is substituted for the pulley 24, and this pulley consists of two substantially similar disks 35 and 36 which are keyed to and movable longitudinally of the sleeve 32. The disks have hub portions 35a, 36a which join annular peripheral rings 35b, 36b in radial ribs 35c, 36c, said ribs interlocking or intermeshing to form the variable and beveled inner friction surfaces 37 and 38. The disks 35 and 36 are shown fully extended in full lines in Fig. 5 of the drawings, and brought together in dotted lines, which illustrates the two extremes of the drive of the belt 39 in connection with the pulley 34. The belt 39 is also of the V-type, or in other words, similar to the belts 22-22e shown in Fig. 1 of the drawings. A companion belt 39a of the unit shown in Fig. 5 of the drawings operates in the groove 31a in the pulley 31.

The hook portions 35a, 36a are provided with projecting lugs 40, 41 at circumferentially spaced intervals and coupled with these lugs are coil springs 42 which pass through recessed or apertured portions of the disks 35, 36. These springs serve to support the disks in tensional engagement with the belt 39 in the variable drives with the pulley 34 and to accomplish this result without changing the center of travel of said belt 39 as with the construction shown in Fig. 1 of the drawings.

In Fig. 4 of the drawings, I have shown another modification which adapts the units for use in connection with wide and flat type belts, or in fact, with belts of various kinds and classes, including what are known as long type belts or built-up belts. In Fig. 4 of the drawings, I have shown at 43, 43a wide flat belts having beveled side edges 44, 44a adapted to operate upon the beveled surfaces of the pulleys 45, 46 employed.

The pulley 45 is of the fixed or non-variable type, or in other words, is similar to the pulleys 21 and 31, and this pulley is welded or otherwise secured to a sleeve 47 rotatably mounted on a shaft 48 which may constitute either of the shafts 11, 12. The pulley 45 has an enlarged hub portion 49 which is recessed as indicated at 50 to form a seat for a coil spring 51. Another coil spring 52 seats upon a grooved collar 53 secured to the sleeve 47. The variable drive pulley 46 is composed of separate disks 54, 55 which have beveled friction drive surfaces 56 and 57 which are arranged opposite to each other as clearly indicated, and these disks are keyed to and movable longitudinally of the sleeve 47. The springs 51 and 52 operate upon the separate disks to maintain the same in frictional engagement with the belt 43a in the several positions of said disks, while maintaining the longitudinal center of drive of the belt 43a always in the same position.

Instead of adjusting one of the shafts by means of the screw 13 as shown in Fig. 1 of the drawings to provide the variable speed drive, the same result can be accomplished by maintaining shafts 11a, 12a in fixed relationship with respect to each other, and arranging a lever 58 on a shaft 59 intermediate the shafts 11a, 12, and providing the ends of the lever 58 with pulleys 60 around which the belts 61 which may be equivalent to the belts 22-22e, 39, 39a, 43, 43a are adapted to pass. By swinging the lever 58 on the shaft 59, the belts 61 may be moved to provide the variable speed drive of the respective units. This result can be accomplished by providing a separate lever for each of the belts employed, it being understood that all levers will be operated in unison, or two or three of such levers may be employed, and the supports 62 may be continuous throughout the series of units employed, which would accomplish the same result.

In a variable speed reduction drive unit such as illustrated in Fig. 1 of the drawings as well as in Fig. 4 of the drawings, the width or thicknesses of the belts employed may be successively varied through a complete drive system to compensate for added torque in a drive of this type, or that is to say, in certain installations of drives of this type. In this connection, it will be understood that my invention is not limited to the use of belts of any particular kind or cross sectional form, and still further, the characteristics of the frictional surfaces of the pulleys may be varied or modified to suit the different types and kinds of belts employed.

In Fig. 6 of the drawings, I have shown at 63 a single variable drive pulley which may be equivalent to any of the pulleys 24, 34 and 46, the pulley 63 shown in Fig. 6 of the drawings, being of a structure similar to the pulley 24, in other words, consists of disks 64 and 65 similar to the disks 25 and 26, both disks being keyed to and movable longitudinally of a sleeve 66 arranged upon a shaft 67. Springs 68 and 69 are employed to tensionally support the disks in engagement with a V-shaped drive belt 70 while maintaining said belt constantly in a single line of travel, which line is represented by the dotted line 71 shown in said figure, in order to at all times maintain the belt in position to properly engage a non-variable pulley 73 arranged upon a shaft 74 as partially represented in Fig. 6 of the drawings. The springs 68 and 69 seat at their outer ends upon collars 75 and 76 secured to the sleeve 66.

For the sake of clarity and simplification in defining the structure, it may be said that each unit comprises a pulley having a fixed diameter and a cone of variable diameter drives; and in the transmission as disclosed in Fig. 1, the belts extend from the pulley of one unit to the variable cone of an opposed unit. It will thus be understood that when the term "pulley" is used, reference is being made to the fixed diameter pulley; and when the term "cone" is used, reference is being made to the variable diameter cone of the unit.

Having fully described my invention, what I claim as new and desire to secure by Letters Patent, is:

1. A variable speed belt drive unit of the character described, said unit comprising a sleeve adapted for free rotary movement on a supporting shaft, a pulley secured to one end of said sleeve, a cone comprising relatively movable discs slidably mounted on and keyed to the other end portion of said sleeve, means at said last named end of the sleeve for retaining the cone discs against displacement from said sleeve, and tensional means for independently moving each of said discs to maintain the same in tensional engagement with the belt arranged therebetween.

2. A variable speed belt drive unit of the character described, said unit comprising a sleeve adapted for free rotary movement on a supporting shaft, a pulley secured to one end of said sleeve, a cone comprising relatively movable discs slidably mounted on and keyed to the other end portion of said sleeve, means at said last named end of the sleeve for retaining the cone discs against displacement from said sleeve, tensional means for independently moving each of said discs to maintain the same in tensional engagement with the belt arranged therebetween, adjacent surfaces of the discs of said cone being beveled and provided with circumferentially spaced ribs, and the ribs of one disc intermeshing with the ribs of the opposed disc for keying said discs together.

3. A variable speed belt drive unit of the character described, said unit comprising a sleeve adapted for free rotary movement on a supporting shaft, a pulley secured to one end of said sleeve, a cone comprising relatively movable discs slidably mounted on and keyed to the other end portion of said sleeve, means at said last named end of the sleeve for retaining the cone discs against displacement from said sleeve, tensional means for independently moving each of said discs to maintain the same in tensional engagement with the belt arranged therebetween, adjacent surfaces of the discs of said cone being beveled and provided with circumferentially spaced ribs, the ribs of one disc intermeshing with the ribs of the opposed disc for keying said discs together, and one of said discs being cut out to receive the ribs of the opposed disc to provide a compact arrangement of said discs one upon the other.

4. A multiple variable speed drive mechanism of the class described comprising a frame, two shafts arranged in parallel and spaced relation in said frame, a plurality of independently rotatable units arranged on one of said shafts, another unit arranged upon the other of said shafts, each of said units comprising a sleeve freely rotatable on its supporting shaft, a pulley fixed to said sleeve and a cone keyed to said sleeve, the units being arranged on said shafts in such manner that the cone of one of the first named units is in alinement with the pulley of the last mentioned unit, and the cone of the last mentioned unit is in alinement with the pulley of the other of said first mentioned units, belts engaging opposed pulleys and cones, each cone comprising relatively movable discs with tensional means for supporting the discs in position to maintain common alinement of the cone with the pulley of an opposed unit, and means for varying the speed of drive of each member between the pulleys engaged thereby and for varying the ratio drive from one unit to the successive units throughout a complete drive mechanism.

5. A multiple variable speed drive mechanism of the class described comprising a frame, two shafts arranged in parallel and spaced relation in said frame, a plurality of independently rotatable units arranged on one of said shafts, other units arranged upon the other of said shafts, each of said units comprising a sleeve freely rotatable on its supporting shaft, a pulley fixed to said sleeve and a cone keyed to said sleeve, the units being arranged on said shafts in such manner that the pulley of the units on one shaft is in alinement with the cones of the units of the opposed shaft whereby belts engaging the pulley and cones of units on opposed shafts will be in common alinement, the cones of each of said units comprising relatively movable discs with tensional means operating upon said discs so as to maintain alinement of said belts in the variable speed drive of the mechanism, one of said shafts being fixed in the frame, means for moving the other of said shafts toward and from the fixed shaft in varying the ratio of drive from one unit to the successive units throughout a complete drive mechanism, and means engaging the pulley of one of the units on the stationary shaft for operating said mechanism.

6. A multiple variable speed drive mechanism of the class described comprising a frame, two shafts arranged in parallel and spaced relation in said frame, a plurality of independently rotatable units arranged on one of said shafts, other units arranged upon the other of said shafts, each of said units comprising a sleeve freely rotatable on its supporting shaft, a pulley fixed to said sleeve and a cone keyed to said sleeve, the units being arranged on said shafts in such manner that the pulley of the units on one shaft is in alinement with the cones of the units of the opposed shaft whereby belts engaging the pulley and cones of units on opposed shafts will be in common alinement, the cones of each of said units comprising relatively movable discs with tensional means operating upon said discs so as to maintain alinement of said belts in the variable speed drive of the mechanism, one of said shafts being fixed in the frame, means for moving the other of said shafts toward and from the fixed shaft in varying the ratio of drive from one unit to the successive units throughout a complete drive mechanism, means engaging the pulley of one of the units on the stationary shaft for operating said mechanism, and means for transmitting the power output of said mechanism to an apparatus to be driven.

JOSEPH NEEDHAM.